INVENTOR.
EMERY I. VALYI

ATTORNEY

Dec. 31, 1968 E. I. VALYI 3,418,692
MOLD CLAMPING APPARATUS
Filed Oct. 6, 1965 Sheet 3 of 6

INVENTOR.
EMERY I. VALYI
BY
ATTORNEYS

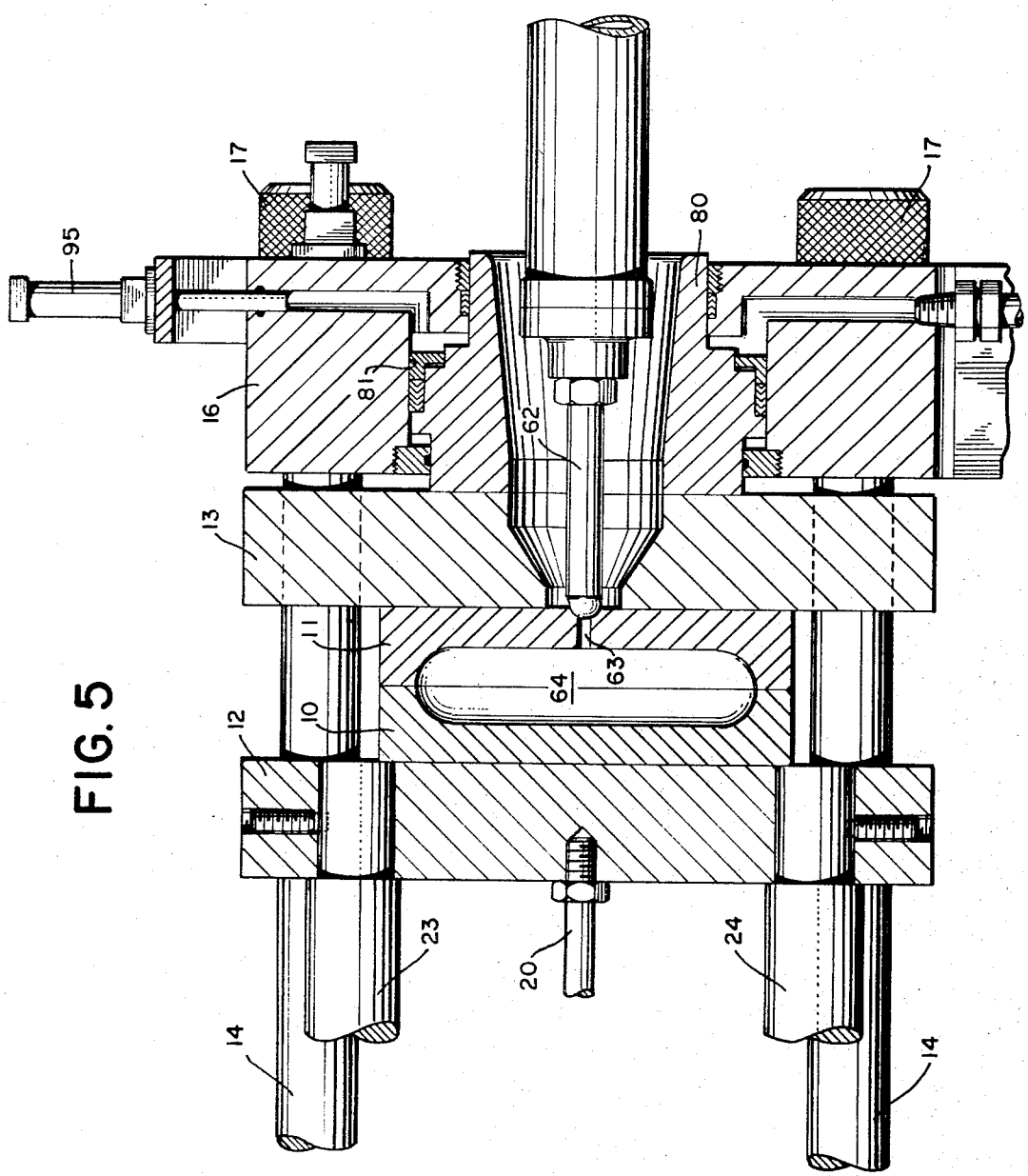

INVENTOR.
EMERY I. VALYI

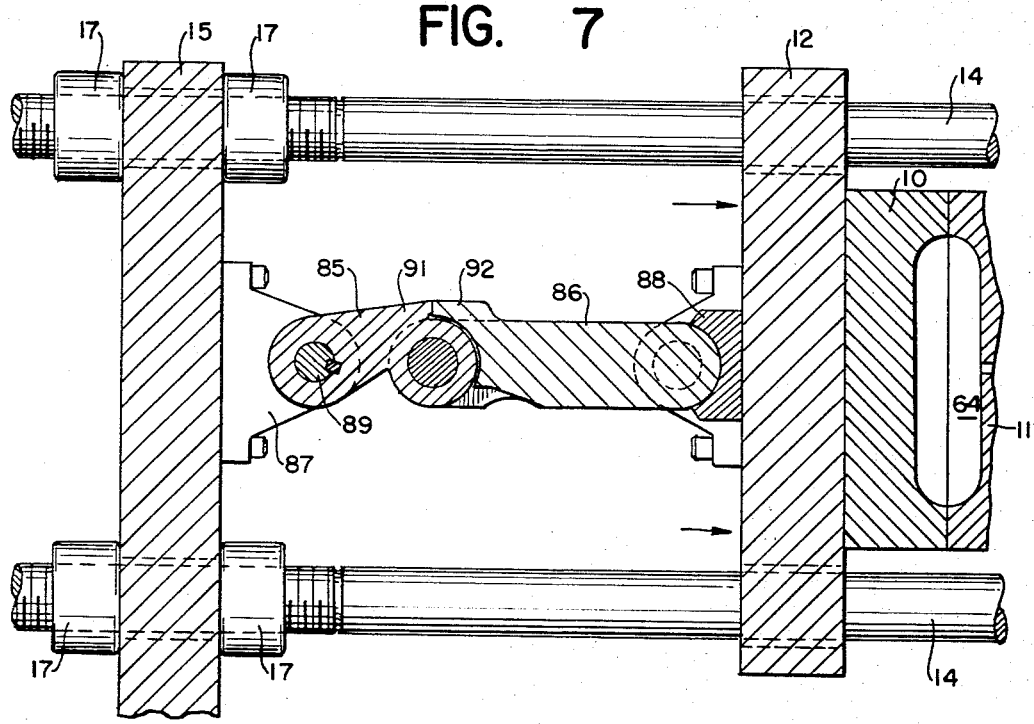
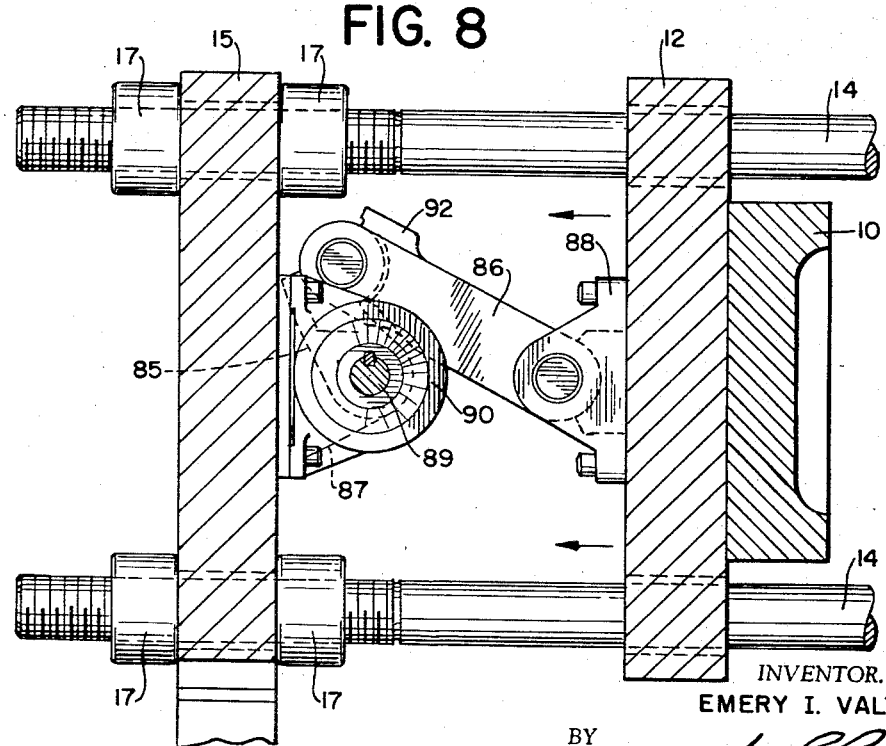

United States Patent Office 3,418,692
Patented Dec. 31, 1968

3,418,692
MOLD CLAMPING APPARATUS
Emery I. Valyi, New York, N.Y.
(5200 Sycamore Ave., Riverdale, N.Y. 10471)
Filed Oct. 6, 1965, Ser. No. 493,489
4 Claims. (Cl. 18—30)

ABSTRACT OF THE DISCLOSURE

Molding apparatus including two platens receiving, respectively, the parts of a two-part mold. One platen is mounted to be moved over a long stroke at relatively low pressure and clamped in molding position. The other platen is moved under high pressure over a short stroke into molding position and held under molding pressure.

---

This invention relates to molding apparatus for the actuation of two piece molds which are to be shifted between open and locked positions during each molding operation.

In one form of the apparatus of the above type which is now in common use one of the mold parts is carried by a fixed platen and the other mold part is mounted on a movable platen which is brought into pressure engagement with the fixed part during the molding operation and is retracted over a substantial distance for the removal of the molded article. In such apparatus provision must be made for shifting the movable platen over a relatively long stroke and also for applying sufficient force to position and hold the movable mold member against the fixed member with a pressure adapted to withstand the pressure which is exerted within the mold during the molding operation. Molding apparatus of this type is commonly employed in the injection molding of plastics, in pressure die casting and other like manufacturing processes.

An object of the present invention is to improve the efficiency of a molding apparatus of the above type.

Another object is to reduce the force which is required for advancing and retracting the movable platen.

Another object is to provide an apparatus of the above type wherein the inertia of the movable platen is reduced and the speed of the operating cycle can be correspondingly increased.

Various other objects and advantages will be apparent as the nature of the invention is more fully disclosed.

In accordance with the present invention the stroke of the movable platen is made such that in its fully advanced position the two mold members are not in contact but remain spaced apart by a relatively short distance. Hence the movable platen encounters no fixed resistance as it reaches its final position and can be moved with a relatively small force. After being positioned it is locked in place and the second platen is moved over the relatively short distance required to close the gap therebetween and is held in contact with the first platen with a sufficiently high pressure to withstand the force exerted within the mold.

In this embodiment one platen is moved over a relatively long stroke with a small force and the other platen is moved over a short stroke and held in molding position under a high pressure.

The invention will be better understood from the following description, taken in connection with the accompanying drawings in which certain specific embodiments have been set forth for purposes of illustration.

In the drawings:

FIG. 5 is a longitudinal section illustrating a modified form of clamp;

FIG. 7 is a section taken along the line 7—7 of FIG. 6 and showing the clamp in the locked position;

FIG. 8 is a section taken along the line 8—8 of FIG. 6 but showing the clamp in released position.

Figure 1:
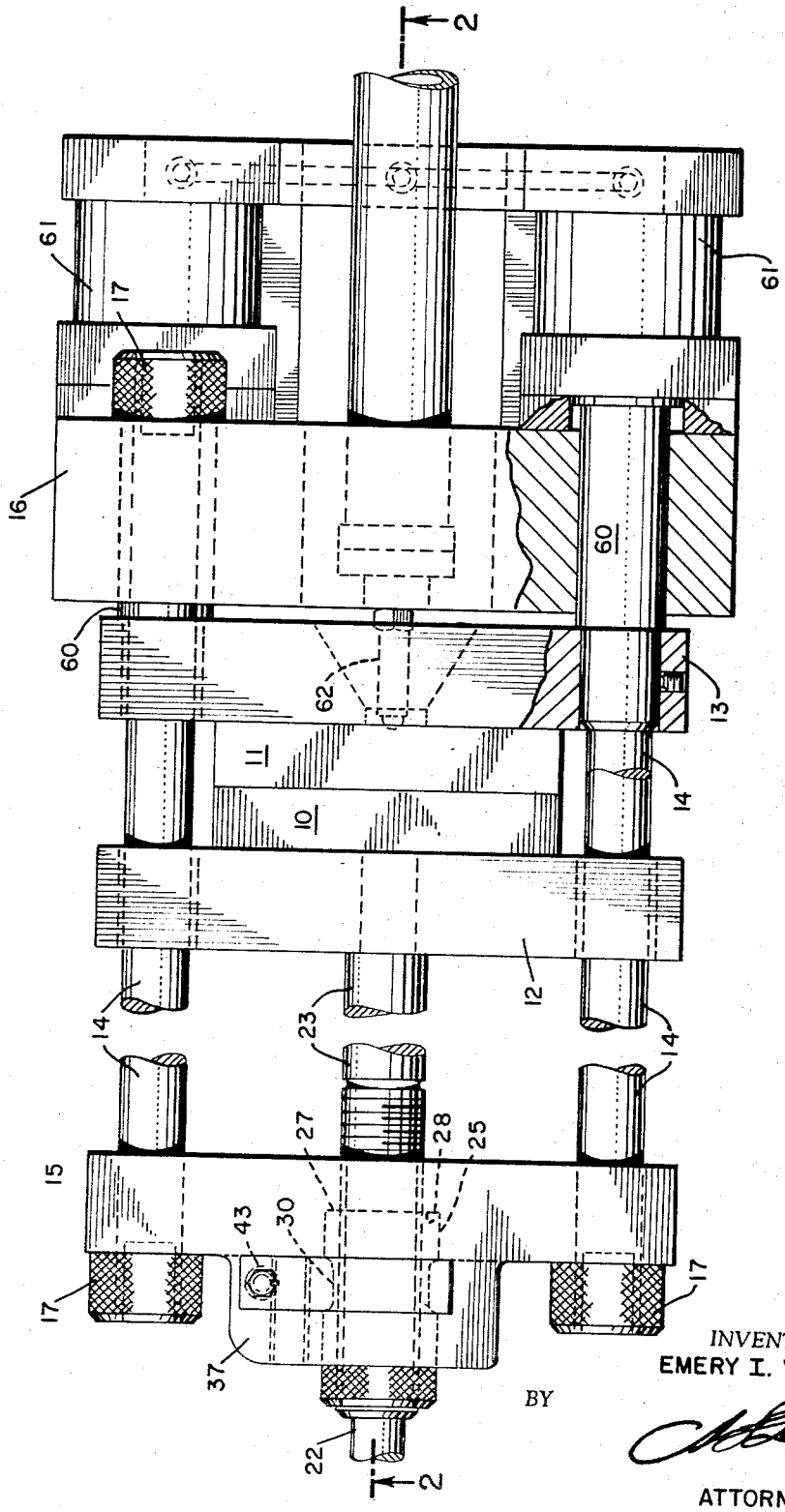
FIG. 1 is a plan view of a molding apparatus embodying the invention with parts in section showing the two-part die in closed position.
Figure 2:
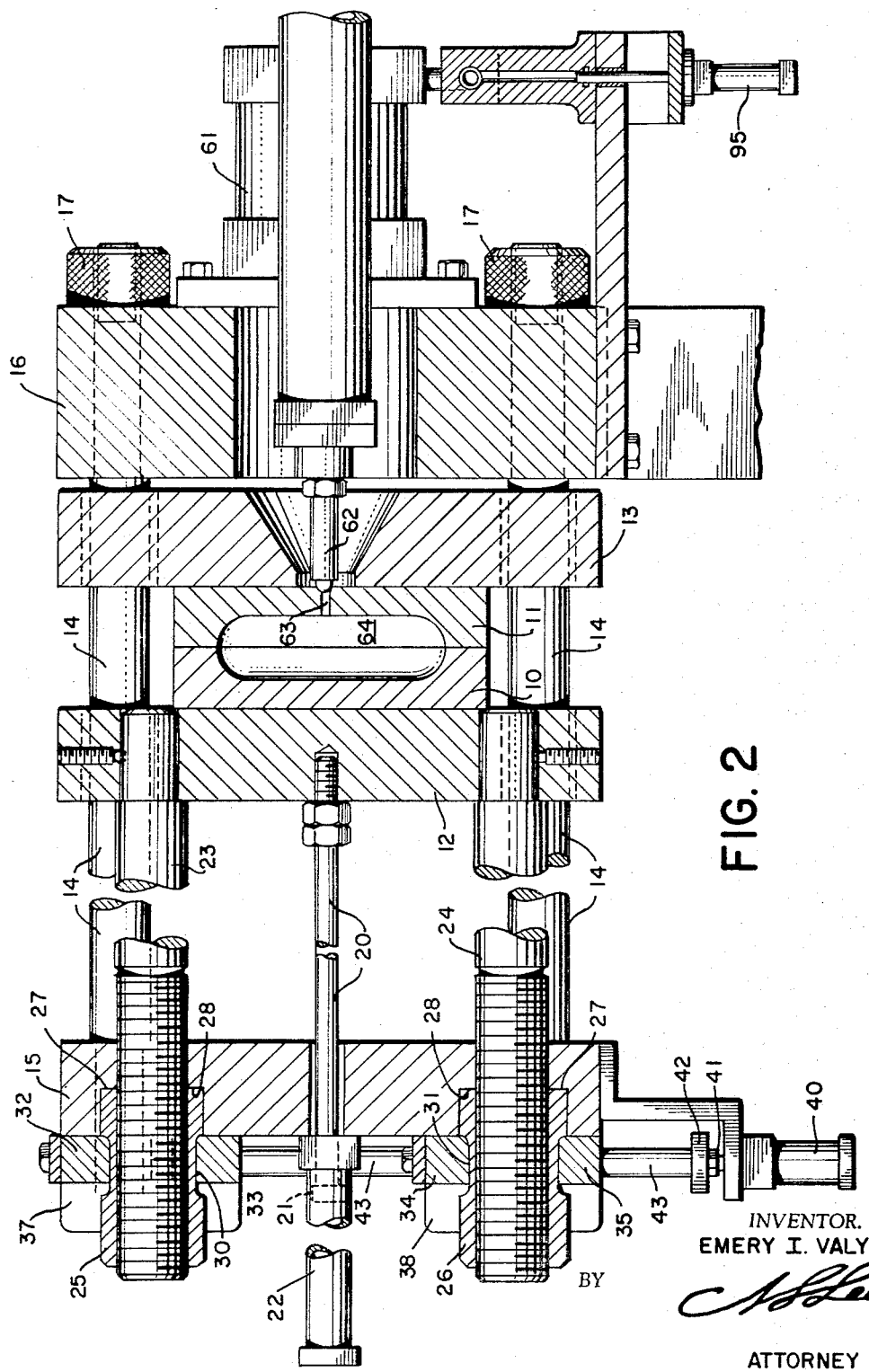
FIG. 2 is a longitudinal section taken along the line 2—2 of FIG. 1.
Figure 3:
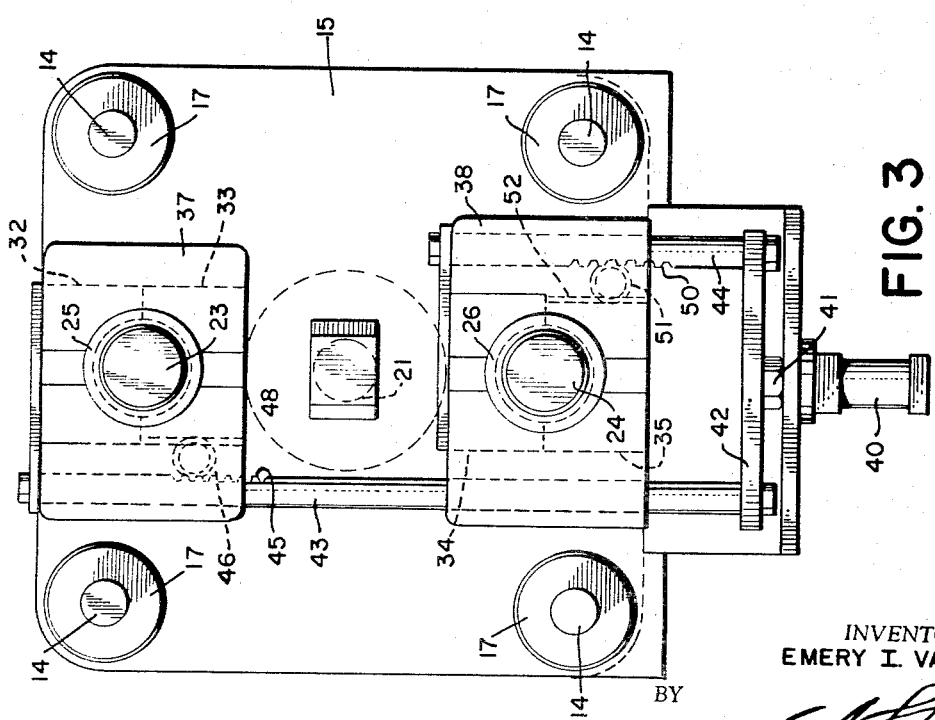
FIG. 3 is an end elevation of the clamping apparatus.

Referring to the drawings more in detail the invention is shown in FIGS. 1, 2, and 3 as embodied in a molding apparatus comprising mold or die parts 10 and 11 carried by platens 12 and 13 respectively both of which are slidably mounted on rods 14 which are secured in support plates 15 and 16 by locking nuts 17.

The platen 12 is reciprocated over a comparatively long path by a piston rod 20 which is fixed to the platen and extends through the support plate 15 to be actuated by a piston 21 in a fluid cylinder 22 which is carried by the plate 15.

The platen 12 is clamped in advanced position for molding by means of a pair of rods 23 and 24 which are secured to the platen and extend through the plate 15. At their free ends the rods 23 and 24 carry stop collars 25 and 26 respectively which are threaded on the rods for adjustment and have annular surfaces 27 seating in recesses 28 in the plate 15 to limit the advance stroke of the platen. The collars 25 and 26 have recessed cylindrical surfaces 30 and 31 which are engaged by pairs of clamping jaws 32, 33, 34, and 35 respectively which are slidably held in suitable recesses in bosses 37 and 38 on the plate 15.

The clamping jaws are actuated by a fluid cylinder 40 mounted on the plate 15 and having a piston rod 41 carrying a cross head 42 on which rods 43 and 44 are mounted. The rod 43 is secured to the jaw 32 and also carries a rack 45 engaging a pinion 46 which is journalled in the boss 37 and actuates a rack 48 on the jaw 33 so that the two clamping jaws 32 and 33 are advanced into clamping engagement with the collar 25 and are retracted therefrom by the forward and return strokes of the piston rod 41.

The rod 44 is connected to the clamping jaw 34 and carries a rack 50 engaging a pinion 51 journalled in the boss 38 and connected to actuate a rack 52 on the jaw 35 so as to advance and retract the jaws 34 and 35 for clamping and releasing the collar 26.

The arrangement is such that after the platen 12 has been fully advanced by actuation of the fluid pressure cylinder 22 it is positively clamped in molding position by actuation of the fluid pressure cylinder 40 to close the clamping jaws 32 to 35 around the collars 25 and 26. Pressure developed within the mold is then resisted by the clamping jaws and not by the fluid pressure in the cylinder 22.

The platen 13 is so positioned that the mold part 11 is spaced by a short gap from the mold part 10 when the latter reaches its fully advanced position. Hence the platen 12 remains free during its entire stroke and the fluid pressure cylinder 22 is not required to exert mold closing pressure or to resist molding pressure. Thus the cylinder 22, which has a relatively long stroke, may be made correspondingly small in cross-section.

In order to advance the platen 13 so as to close the gap between the mold parts 10 and 11 and to hold the platen under sufficient pressure to resist the molding force the platen 13 carries a pair of piston rods 60 which extend through the plate 16 and are actuated by relatively large fluid pressure cylinders 61 carried by the plate 16. Since the apparatus shown in these drawings is an injection molding machine, an injection nozzle 62 extends through the plate 16 and through the platen 13 to inject the plastic material through a sprue 63 into the mold cavity 64. The nozzle 62 is held in injection position by suitable fluid pressure means not shown.

In operation the platen 12 is first advanced into molding position while the platen 13 is retracted. The platen 12 is then clamped by the clamping jaws 32 to 35 to fix the same in molding position. The platen 13 is then moved the short distance necessary to close the gap between the mold parts 10 and 11 by actuation of the fluid pressure cylinders 61 and is held under pressure during the injection period. Since the platen with the long stroke requires a small actuating force the weight of the parts is reduced and the speed of operation is correspondingly increased. The apparatus can be adapted for die forming or molding of plastic materials or of metal, depending upon the specific construction of the parts.

Figure 4:
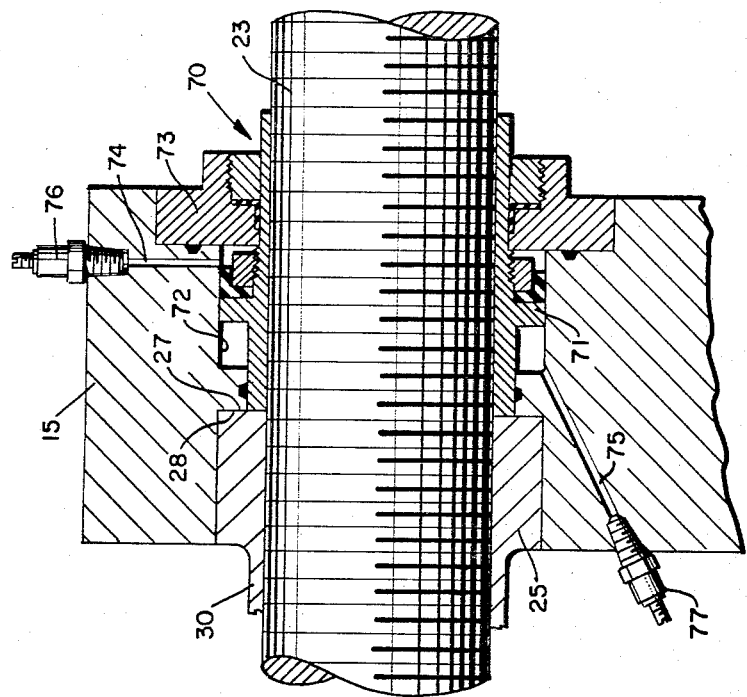
FIG. 4 is a sectional view illustrating a cushioning device which may be incorporated in the molding apparatus.

FIG. 4 illustrates a cushioning device which may be incorporated in the apparatus of FIGS. 1 to 3 for cushioning the movement of the platen 12 at each end of its stroke. In this embodiment a sleeve 70 is disposed around each of the rods 23 and 24 and extends through the plate 15 from the recess 28 to project beyond the inner surface of the plate. The sleeve 70 is formed with an annular projecting rib or flange 71 which slides in a cylinder 72 formed in the plate 15. The cylinder 72 is closed at its inner end by an annular closure member 73. Bleeder holes 74 and 75 closed by adjustable valves 76 and 77 communicate with the cylinder 72 on opposite sides of the flange 71 for controlling the cushioning effect as the sleeve is shifted in one direction by the surface 27 of the collar 25 and in the other direction by engagement with the platen 12. The cushioning device is particularly useful in cases where the movement of the platen is rapid and the stroke is comparatively long.

Alternatively the movement of platen 12 may be cushioned directly by platen 13. For that purpose platen 13 may be advanced beyond the molding position. Cylinders 61 are provided with hydraulic speed control means such that the advance of platen 12 past the initial contact with platen 13 to the molding position is cushioned by the controlled movement of the pistons within cylinders 61.

In the embodiment of FIG. 5 the platen 13 carries a piston 80 which is disposed to slide in a cylinder 81 which is formed directly in the inner face of the plate 16. The injection nozzle 62 extends through an axial opening in the piston 80 and thence into injection position in the mold part 11 and is held in position by fluid pressure means not shown.

This embodiment is similar to that above described except that the actuating cylinder for the platen 13 is formed integrally in the plate 16.

Figure 6:
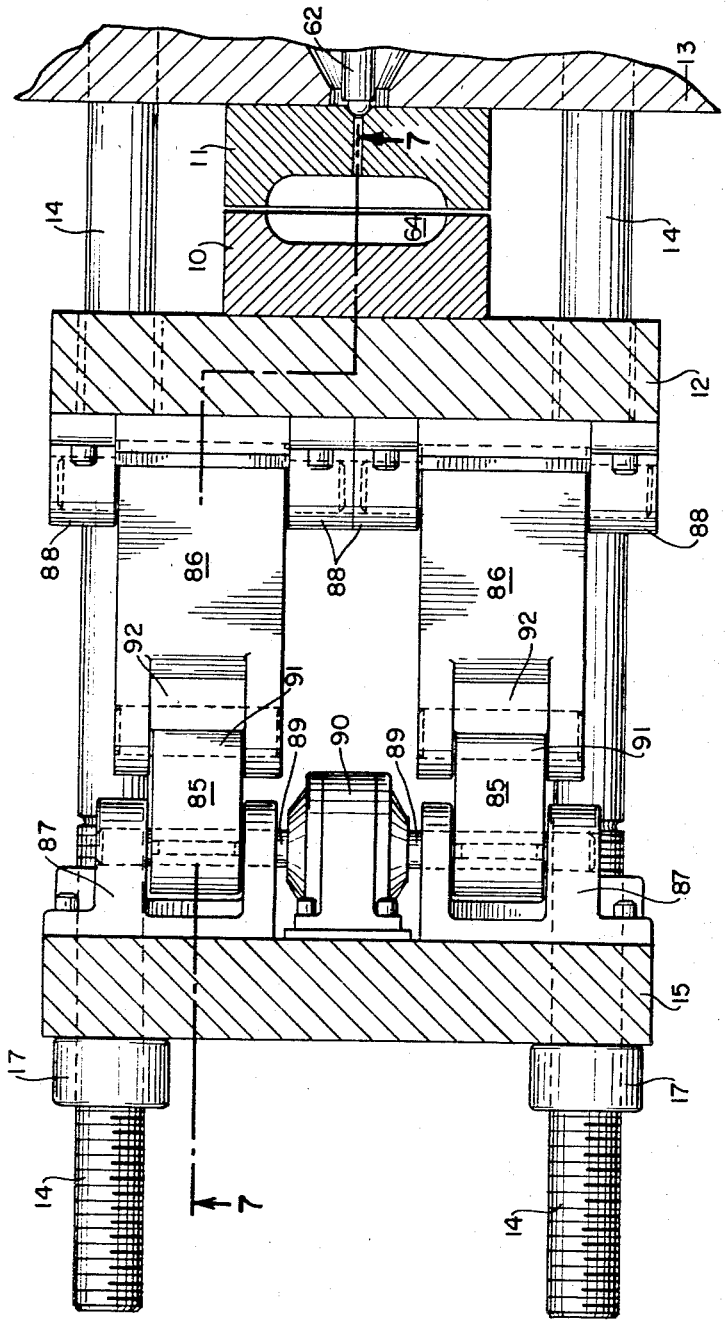
FIG. 6 is a view partly in section of still another form of clamp.

FIGS. 6, 7 and 8 illustrate an embodiment similar to that above described except that mechanical means is used for actuating and locking the platen 12. In this form the fluid pressure cylinders 22 and 40 and cooperating parts are omitted and the platen 12 is actuated by a toggle mechanism comprising links 85 and 86 pivoted respectively in boss 87 on the inner face of the plate 15 and boss 88 on the platen 12 and adapted to shift the platen between molding position as shown in FIG. 7 and open position as shown in FIG. 8.

The links 85 are keyed to a rod 89 which is journalled in boss 87 and is rotatable to shift the toggle from open to closed positions. The shaft 89 is connected to a reversible rotor of a fluid motor in housing 90 which is carried by the plate 15 and is adapted to be actuated by fluid pressure for actuating the toggles as above described. The toggles are so arranged that the links are shifted past center to a locked position when the platen is fully advanced. Projections 91 and 92 are formed integrally with links 85 and 86 respectively. These projections limit the movement of the links in the locked position as shown in FIG. 7. The toggles thus serve both to advance the platen and to lock it in advanced position.

In order to increase the fluid pressure available to actuate the cylinders 61, intensifier cylinders 95 may be connected between the fluid pressure line and the cylinders 61. These intensifier cylinders may be of standard construction and include a piston of relatively large area actuated by line pressure and a piston of relatively small area operating in a cylinder connected to the cylinders 61. In this way a much higher pressure is developed by the small pistons and is applied to the main actuating cylinders 61. The latter can thus be made smaller than would be the case if line pressures only were to be used. It is to be understood that such intensifier cylinders may be used in the embodiment of FIGS. 1 and 3 if desired.

Although certain specific forms of apparatus have been set forth for purposes of illustration it is to be understood that the invention may be adapted to various uses as will be apparent to a person skilled in the art.

What is claimed is:

1. Molding apparatus comprising a two part separable mold, a pair of platens carryings the respective mold parts, means mounting one of said platens for a relatively long reciprocating stroke between molding and retracted positions, means mounting the other of said platens for a relatively short reciprocating stroke between molding and retracted positions, said strokes being so related that a small gap is provided between said mold parts when said first platen is fully advanced and said second platen is fully retracted, means connected to fully advance said first platen while said second platen is in retracted position, mechanical means to lock said first platen in advanced position, and means for then advancing said second platen into molding position and to apply pressure thereon for holding said mold parts closed during the molding operation.

2. Molding apparatus as set forth in claim 1 in which means is provided to advance said second platen past molding position to be engaged and retracted by said first platen and cushioning means is connected to resist retraction of said second platen into molding position.

3. Apparatus as set forth in claim 1 in which toggle means is provided to actuate and to lock said first platen, said toggle means including pivoted links, a rotatable post carrying said links, and means for rotating said post for advancing and retracting said links.

4. Molding apparatus as set forth in claim 1 including a member movable with said first platen, stop means carried by said member to limit the stroke of said first platen, said stop means including clamping jaws adapted to engage said member and fluid pressure means connected to actuate said clamping jaws.

References Cited

UNITED STATES PATENTS

| | | | |
|---|---|---|---|
| 2,841,826 | 7/1958 | Brucker | 25—91 X |
| 2,862,238 | 12/1958 | Cuzzi | 18—30 |
| 3,120,039 | 2/1964 | Stubbe et al. | 18—30 |
| 3,183,555 | 5/1965 | Siegel | 18—30 |
| 3,245,122 | 4/1966 | Maurer | 18—30 |

WILBUR L. McBAY, Primary Examiner.

U.S. Cl. X.R.

164—341